350-96.25
XR 3,038,959
CROSS REFERENCE SEARCH ROOM
1 X 3074T

June 12, 1962 R. L. BEURLE 3,038,959 X2530

IMAGE REPRODUCERS

Filed Aug. 20, 1959

INVENTOR
Raymond Louis Beurle
BY Baldwin & Wight
ATTORNEY

3038959
NO OR CLASSIF

United States Patent Office 3,038,959

Patented June 12, 1962

3,038,959
IMAGE REPRODUCERS

Raymond Louis Beurle, Great Baddow, England, assignor to English Electric Valve Company Limited, London, England, a company of Great Britain Filed Aug. 20, 1959, Ser. No. 835,094
4 Claims. (Cl. 178—7.2)

Figure 1:
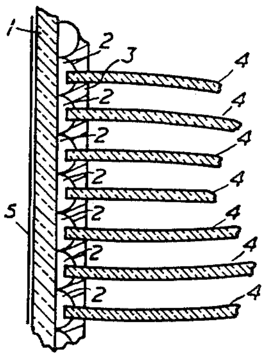

This invention relates to image reproducers and, though not limited to its application thereto, is particularly suitable for and primarily intended for amplification or intensification of optical images produced on X-ray screens.

It is well known to intensify images produced on X-ray screens by optically reducing the images in size and then televising the reduced images, that is to say, translating them into picture signals by means of a television camera tube supplying its picture signals via an amplifier to a television reproducer tube.

A difficulty which arises in image amplifiers and intensifiers of the nature just described is that of collecting a reasonable proportion of the light emitted by the X-ray screen, for it is only by increasing the efficiency of light collection above that of the human eye that what may be termed an X-ray television system can be made to show advantage over the human eye when adapted to dark conditions.

It may be shown that, with any normal optical system for forming on the photo cathode of the television camera tube a reduced size image derived from that on the X-ray screen, the proportion of light collected from the X-ray screen decreases as the area of the image on the photocathode of the camera tube decreases. It is therefore of considerable advantage to keep the image at the camera tube cathode as large as possible so that the total light collected shall be as high as possible. In practice, however, there are serious difficulties in the way of providing camera tubes with very large photo-cathodes, with the result that, in common practice, the proportion of light from the X-ray screen actually made use of does not much cxeeed a figure of about 2% or 3%.

The main object of the present invention is to provide an image amplifying or intensifying system of the television type whereby good utilisation of the light from the original image is achieved.

According to this invention an image reproducer arrangement comprises a large plurality of small light-collecting reflectors arranged to receive light from a different small portion of the area of said image, and a plurality of light guides each of substantially uniform diameter over its length and each having its light input end in a different one of said reflectors, the light output ends of said guides being brought together in juxtaposition so as to combine to provide a light image of reduced size relative to the size of the image to be intensified. The image of reduced size will be of increased brightness as compared to the original image (i.e. the image as it would appear before any of the apparatus provided by this invention is added) and advantage in this respect will therefore be gained even if the said reduced size image is merely directly viewed by eye. The main advantages of the invention are, however, achieved when the reduced size image is televised and, therefore, in normal practice of the invention, means are provided for televising the said light image of reduced size.

By the term "light guide" is meant an internally reflecting elongated tube or solid member which will transmit light incident upon one end thereof to the other end thereof. Such light guides are well known per se and, in carrying out the present invention, will usually consist of solid glass or other light transmitting filaments. Theoretically, however, they may be constituted by very small diameter internally polished tubes.

In order to ensure maximum resolution and also to ensure that maximum light delivered at the output ends of the light guides shall be available for utilisation by a television camera tube employed for televising the reduced size image, an optical system of substantiallly unity magnification may be provided for focusing said reduced size image on to the optical image-receiving surface of said tube. Preferably the said optical system is one in which light from said reduced size image is projected into a solind block of light transmitting material on to a reflecting surface provided thereon and reflected back by said surface through said block on to the image-receiving member of the camera tube.

In a preferred embodiment of the invention an X-ray image amplifier or intensifier comprises a plurality of small cup-like reflectors arranged in juxtaposition to one another on and facing the X-ray image producing screen, a plurality of light guides each having one end entered centrally into the back of a different one of said reflectors, the light output ends of said guides being brought together in juxtaposition in an image surface of reduced size as compared to that of the X-ray screen image surface, and a solid block of light transmitting material having one end surface against a part of which the light output ends of the light guides are placed and against another part of which the image receiving member of a television camera tube is placed, said block having a convexly curved reflecting surface opposite said one end surface.

Figure 2:
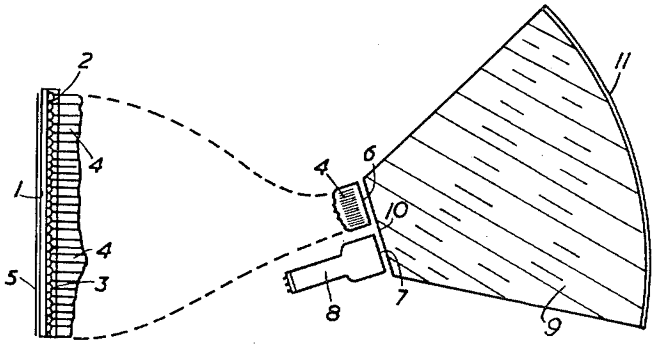

The invention is illustrated purely schematically in the accompanying drawings in which FIG 1 is a representation of one embodiment of the invention showing the arrangement at the light input ends of the light guides, and FIG. 2 is a representation showing an embodiment from the X-ray tube screen to the television camera tube.

Referring to FIG. 1, an X-ray screen 1 is arranged to produce optical images in the usual well known way. The area of the screen is covered, or nearly covered, by a large plurality of small cup-like reflectors, which face towards the screen and each of which collects light from a small area thereof. The reflectors 2 are held in position by any convenient means such as a solid backing support 3. In fact the said reflectors may be constituted by reflecting deposits on suitably shaped recesses on one side of the support 3. Entered centrally into the back of each of the reflectors is a light guide 4 which may be constituted by a highly polished glass filament. As will be seen these light guides, which will have a considerable degree of mechanical flexibility, are necessarily spaced apart at the ends adjacent the X-ray screen. At their other ends (not shown in FIGURE 1) the light guides are brought together in juxtaposition so that together they occupy a reduced area image surface. The reduced area image (not shown in FIGURE 1) is employed as the subject of transmission of a television camera tube (not shown in FIGURE 1) the signals from which, after suitable amplification, are reproduced by a television reproducer tube (also not shown in FIGURE 1) providing a visible image of desired suitable intensity and size. Preferably, and as shown conventionally in FIGURE 1, the side of the X-ray screen 1 remote from the small reflectors 2 is lightly silvered as at 5 so as to reflect back into the light guides 4 light reflected by the reflectors 2.

A preferred general arrangement is shown in FIGURE 2. Here the numeral 1 again represents the X-ray screen with its lightly silvered face 5 and the light guides are shown at 4. At their output ends the light guides are brought together in a reduced area image surface marked 6 in FIGURE 2. This reduced size image may be focused by any suitable unity magnification optical system on to the photo cathode 7 of a television camera tube 8. In the arrangement shown in FIGURE 2, however, what may be termed a solid optical system is employed for the transmission of light from the surface 6 to the surface 7. This system comprises a solid block 9 of light transmitting material, e.g. glass, having a flat end face 10 against which the reduced image surface 6 is placed and which is partly occupied by that reduced image. The photocathode 7 of the camera tube is placed up against another part of the surface 10. The block 9 terminates in a curved surface 11 which is silvered to act as a reflector. This optical arrangement has the advantage of tending to overcome scattering of the light emerging from the ends of the light guides. When light enters the solid block 9 it is refracted in such manner as to be scattered over a smaller solid angle than would be the case if there were no block 9 and the greater part of the light accordingly falls upon the silvered surface 11 and is thus reflected back to the photo-cathode 7 of the television camera tube.

I claim:

1. An image reproducer arrangement comprising a screen adapted to reproduce an optical image, said screen having thereon a large plurality of small light-collecting reflectors, arranged in a direction facing said screen so as to receive light from a different small portion of the area of said image, and a plurality of light guides each of substantially uniform diameter over its length and each having its light input end in a different one of said reflectors, the cross sectional dimension of each light guide being less than the corresponding dimension of the reflector which it enters, the light output ends of said guides being brought together in juxtaposition so as to combine to provide a light image of reduced size relative to the size of the image to be intensified.

2. In combination an arrangement as claimed in claim 1, a television camera tube for televising the image of reduced size and an optical system of substantially unity magnification arranged to focus said image of reduced size on to the optical image-receiving surface of said tube.

3. A combination as claimed in claim 2 wherein the optical system is one in which light from said reduced size image is projected into a solid block of light transmitting material on to a reflecting surface provided thereon and reflected back by said surface through said block on to the image-receiving member of the camera tube.

4. An X-ray image amplifier comprising a plurality of small cup-like reflectors arranged in juxtaposition to one another on and facing the X-ray image producing screen, a plurality of light guides each having one end entered centrally into the back of a different one of said reflectors, the cross sectional dimension of each light guide being less than the corresponding dimension of the reflector which it enters, the light output ends of said guides being brought together in juxtaposition in an image surface of reduced size as compared to that of the X-ray screen image surface, a solid block of light transmitting material having one end surface adjacent the light output ends of the light guides and a television camera tube placed with its image receiving member against said one end surface, said block having a convexly curved reflecting surface opposite said one end surface.

References Cited in the file of this patent

UNITED STATES PATENTS

| | | |
|---|---|---|
| 1,751,584 | Hansell | Mar. 25, 1930 |
| 2,354,591 | Goldsmith | July 25, 1944 |
| 2,510,106 | Henroteau | June 6, 1950 |
| 2,877,368 | Sheldon | Mar. 10, 1959 |